(12) United States Patent
Yamato et al.

(10) Patent No.: US 6,993,367 B2
(45) Date of Patent: Jan. 31, 2006

(54) IN-CAR TELEPHONE SYSTEM, HANDS-FREE UNIT AND PORTABLE TELEPHONE UNIT

(75) Inventors: Toshitaka Yamato, Kobe (JP); Hideki Kitao, Kobe (JP); Shinichi Iwamoto, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 516 days.

(21) Appl. No.: 10/233,484

(22) Filed: Sep. 4, 2002

(65) Prior Publication Data

US 2004/0204161 A1  Oct. 14, 2004

(51) Int. Cl.
*H04M 1/00* (2006.01)

(52) U.S. Cl. .............................. 455/569.2; 455/569.1; 455/575.9

(58) Field of Classification Search ............. 455/569.1, 455/569.2, 557, 556.1, 575.1, 572, 573, 151.2, 455/412.1, 570; 379/55.1, 433.01, 433.02, 379/432
See application file for complete search history.

(56) References Cited

U.S. PATENT DOCUMENTS

| | | | | |
|---|---|---|---|---|
| 5,333,176 | A * | 7/1994 | Burke et al. ................ | 455/557 |
| 6,115,620 | A * | 9/2000 | Colonna et al. ......... | 455/569.1 |
| 6,292,573 | B1 * | 9/2001 | Zurek et al. ................ | 381/386 |
| 6,505,057 | B1 * | 1/2003 | Finn et al. ............... | 455/569.2 |
| 6,542,758 | B1 * | 4/2003 | Chennakeshu et al. .. | 455/569.2 |
| 6,690,956 | B2 * | 2/2004 | Chua et al. .............. | 455/569.2 |
| 2002/0032048 | A1 * | 3/2002 | Kitao et al. | |
| 2002/0032510 | A1 * | 3/2002 | Turnbull et al. .............. | 701/49 |
| 2002/0177472 | A1 * | 11/2002 | Tomoda et al. ............. | 455/569 |
| 2003/0003912 | A1 * | 1/2003 | Melpignano et al. ........ | 455/436 |
| 2003/0032460 | A1 * | 2/2003 | Cannon et al. ............. | 455/569 |
| 2003/0073469 | A1 * | 4/2003 | Wu ............................ | 455/569 |
| 2003/0224840 | A1 * | 12/2003 | Frank et al. ............. | 455/575.9 |
| 2004/0192403 | A1 * | 9/2004 | Lejman et al. ........... | 455/569.1 |
| 2004/0248623 | A1 * | 12/2004 | Nelson et al. ........... | 455/569.1 |

* cited by examiner

*Primary Examiner*—Charles N. Appiah
*Assistant Examiner*—Joy Contee
(74) *Attorney, Agent, or Firm*—Wenderoth, Lind & Ponack, L.L.P.

(57) ABSTRACT

An in-car telephone system of great convenience is provided when switching between a hands-free conversation and a conversation using a handset of a portable telephone (a handset conversation), which has a portable telephone conducting wireless telephone communication and a hands-free unit, being connected to the portable telephone, which outputs a receiving voice from the portable telephone through a speaker arranged in a car and outputs an aural signal input from a microphone arranged in the car to the portable telephone as a transmitting signal. The in-car telephone system includes a connection detector to detect the communicative connection between the portable telephone and the hands-free unit during a handset conversation using a microphone and a speaker included in the portable telephone, and a mode switching device to switch from a handset conversation condition to a hands-free conversation condition using the microphone and the speaker arranged in the hands-free unit when the connection between the portable telephone and the hands-free unit during a handset conversation is detected by the connection detector.

27 Claims, 3 Drawing Sheets

200~# IN-CAR TELEPHONE SYSTEM, HANDS-FREE UNIT AND PORTABLE TELEPHONE UNIT

BACKGROUND OF THE INVENTION

1. Field of the Invention

The present invention relates to an in-car telephone system wherein a portable telephone unit and a hands-free unit are communicatively connected, whereby conversations through the portable telephone unit can be held using a speaker and a microphone of the hands-free unit, the hands-free unit and the portable telephone unit.

2. Description of the Relevant Art

When one speaks over the telephone while riding in an automobile (especially operating an automobile), one cannot hold a handset in one's hand, or to hold a handset in one's hand often makes driving dangerous. Therefore, hands-free units whereby conversations can be held using a microphone and a speaker arranged in the interior of a car have been used so far. Conventionally, mobile telephone units designed specifically for cars had been used as telephones mounted on cars, but nowadays, telephone units of a dual-purpose type with which hands-free conversations can be held by connecting a portable telephone to a hands-free unit arranged in a vehicle through a connector are becoming more common because of widespread use of portable telephones.

However, in cases where a portable telephone is used as a part of a hands-free unit, or in cases where a portable telephone which had been used as a part of a hands-free unit is used as a normal portable telephone, it becomes necessary to disconnect communication between the portable telephone and the hands-free unit by detaching the portable telephone from the connector or the like. For the disconnecting operation, it is necessary to end the telephone conversation, or when the disconnecting operation is conducted during talking over the telephone, the telephone conversation is broken off. Therefore, in the case of getting in or out of a car during a telephonic communication, one needs to make a call again at great inconvenience.

SUMMARY OF THE INVENTION

The present invention was accomplished in order to solve the above problem, and it is an object of the present invention to provide an in-car telephone system, a hands-free unit and a portable telephone unit, which are highly convenient when switching between a hands-free conversation and a conversation using a handset of a portable telephone (hereinafter, referred to as a handset conversation) is performed.

In order to solve the above problem, an in-car telephone system (1) according to the present invention is characterized by being an in-car telephone system having a portable telephone unit conducting wireless telephone communication and a hands-free unit, being connected to the portable telephone unit, which outputs a receiving voice from the portable telephone unit through a speaker arranged in a car, and outputs an aural signal input from a microphone arranged in the car to the portable telephone unit as a transmitting signal, comprising a connection detector to detect that the portable telephone unit and the hands-free unit were communicatively connected during a handset conversation with a microphone and a speaker included in the portable telephone unit, and a mode switching device to switch from a handset conversation condition to a hands-free conversation condition with the microphone and the speaker arranged in the hands-free unit when the connection between the portable telephone unit and the hands-free unit during a handset conversation is detected by the connection detector.

Using the above in-car telephone system (1), in cases where the portable telephone unit and the hands-free unit are communicatively connected by getting on a car during a handset conversation or the like, the condition is changed to a condition in which a hands-free conversation can be held with maintaining the speaking state. Therefore, the operation of making a call again or the like becomes unnecessary, resulting in a great convenience.

An in-car telephone system (2) according to the present invention is characterized by the mode switching device, which switches to a combination mode wherein both a handset conversation and a hands-free conversation can be held for a prescribed period after detecting the connection between the portable telephone unit and the hands-free unit in the above in-car telephone system (1).

Using the above in-car telephone system (2), since it becomes possible to hold both conversations for a prescribed period when switching from a handset conversation to a hands-free conversation, it is possible to prevent the user from being confused because of the changed conversation condition wherein it suddenly becomes impossible to continue the handset conversation, for example. And since the period of combination is limited, the adverse effects of the combination such as howling noises caused by sound input/output interference between the hands-free unit and the portable telephone unit can be minimized.

An in-car telephone system (3) according to the present invention is characterized by the prescribed period of the combination mode, being a prescribed time in the above in-car telephone system (2).

Using the above in-car telephone system (3), talking by both conversation methods is made possible only for a prescribed time when switching from a handset conversation to a hands-free conversation.

An in-car telephone system (4) according to the present invention is characterized by comprising a combination time setting device to set the prescribed time defining the prescribed period of the combination mode in the above in-car telephone system (3).

Using the above in-car telephone system (4), it becomes possible to set a time during which talking by both conversation methods can be conducted when switching from a handset conversation to a hands-free conversation according to the user's preference.

An in-car telephone system (5) according to the present invention is characterized by the conclusion of the prescribed period of the combination mode, being based on the instant when the portable telephone unit is placed on a mounting device arranged in the car in the above in-car telephone system (2).

Using the above in-car telephone system (5), talking by both conversation methods can be conducted until the portable telephone unit is placed on the mounting device, or until when it can be presumed that the user finished making preparations for holding a hands-free conversation.

An in-car telephone system (6) according to the present invention is characterized by the conclusion of the prescribed period of the combination mode, being based on the instant when the wire connection between the portable telephone unit and the hands-free unit is established using a connector in the above in-car telephone system (2).

Using the above in-car telephone system (6), talking by both conversation methods can be conducted until the portable telephone unit is connected through the connector to the hands-free unit, or until when it can be presumed that the user finished making preparations for holding a hands-free conversation.

An in-car telephone system (7) according to the present invention is characterized by the conclusion of the prescribed period of the combination mode, being based on the instant when an ignition switch is turned on in the above in-car telephone system (2).

Using the above in-car telephone system (7), talking by both conversation methods can be conducted until a driver gets ready for driving, or until talking by the hands-free conversation method becomes suitable with reliability.

An in-car telephone system (8) according to the present invention is characterized by the conclusion of the prescribed period of the combination mode, being based on the instant when a hands-free conversation starting switch included in the hands-free unit is operated in the above in-car telephone system (2).

Using the above in-car telephone system (8), talking by both conversation methods can be conducted until the time based on the instant when the hands-free conversation starting switch is operated, or until the instant when a driver or the like indicates his/her intention to start a hands-free conversation.

An in-car telephone system (9) according to the present invention is characterized by the prescribed time of the combination mode, whose upper limit is a predetermined upper limit time in any of the above in-car telephone systems (4)–(8).

Using the above in-car telephone system (9), the handset conversation is stopped after the upper limit time elapsed, even if predetermined conditions are not met. Therefore, it is possible to minimize the adverse effects of the combination such as howling noises caused by sound input/output interference between the hands-free unit and the portable telephone unit.

An in-car telephone system (10) according to the present invention is characterized by the connection detector, which detects the communicative connection using a taking-a-seat sensor to detect an occupant's taking a seat in any of the above in-car telephone systems (1)–(9).

Using the above in-car telephone system (10), it becomes possible to hold a hands-free conversation from the instant when an occupant such as a driver takes a seat.

An in-car telephone system (11) according to the present invention is characterized by the connection detector, which detects the communicative connection by reason of a door of the car being unlocked and opened in any of the above in-car telephone systems (1)–(9).

Using the above in-car telephone system (11), it becomes possible to hold a hands-free conversation from the instant when an occupant such as a driver unlocks a door of the car and opens the door to get onto the car.

An in-car telephone system (12) according to the present invention is characterized by comprising an off-operation detector to detect the off operation of an ignition switch during the hands-free conversation condition, and a mode return device to switch from the hands-free conversation condition to the handset conversation condition when the off operation of the ignition switch is detected by the off-operation detector in any of the above in-car telephone systems (1)–(11).

Using the above in-car telephone system (12), the condition is changed to a condition in which a handset conversation can be held with maintaining the speaking state by conducting the off operation of the ignition switch during the hands-free conversation. Therefore, even if the conversation is continued using the portable telephone unit, the operation of making a call again or the like becomes unnecessary, resulting in a great convenience.

An in-car telephone system (13) according to the present invention is characterized by the mode return device, which switches to a return combination mode wherein both a handset conversation and a hands-free conversation can be held for a prescribed period after detecting the off operation of the ignition switch in the above in-car telephone system (12).

Using the above in-car telephone system (13), since both conversations can be held for a prescribed period when switching from a hands-free conversation to a handset conversation, it is possible to prevent the user from being confused because of the changed conversation condition wherein it suddenly becomes impossible to continue the hands-free conversation, for example. And since the combination period is limited, the adverse effects of the combination such as howling noises caused by sound input/output interference between the hands-free unit and the portable telephone unit can be minimized.

An in-car telephone system (14) according to the present invention is characterized by the prescribed period of the return combination mode, being a prescribed time in the above in-car telephone system (13).

Using the above in-car telephone system (14), talking by both conversation methods can be held only for a prescribed time when switching from a hands-free conversation to a handset conversation.

An in-car telephone system (15) according to the present invention is characterized by comprising a return combination time setting device to set the prescribed time defining the prescribed period of the return combination mode in the above in-car telephone system (14).

Using the above in-car telephone system (15), it becomes possible to set a time during which talking by both conversation methods can be conducted when switching from a hands-free conversation to a handset conversation according to the user's preference.

An in-car telephone system (16) according to the present invention is characterized by the conclusion of the prescribed period of the return combination mode, being based on the instant when a handset conversation starting switch included in the portable telephone unit is operated in the above in-car telephone system (13).

Using the above in-car telephone system (16), talking by both conversation methods can be conducted until the time based on the instant when the handset conversation starting switch is operated, or until the instant when a driver or the like indicates his/her intention to start a handset conversation.

An in-car telephone system (17) according to the present invention is characterized by the conclusion of the prescribed period of the return combination mode, being based on the instant when it is detected that an occupant left the seat using a taking-a-seat sensor to detect an occupant's taking a seat in the above in-car telephone system (13).

Using the above in-car telephone system (17), the hands-free conversation is stopped from the instant when an occupant such as a driver gets off the car, or from the instant when there becomes no necessity of the hands-free conversation with reliability.

An in-car telephone system (18) according to the present invention is characterized by the conclusion of the prescribed period of the return combination mode, being based on the instant when a door of the car is opened, closed again, and then locked in the above in-car telephone system (13).

Using the above in-car telephone system (18), the hands-free conversation is stopped from the instant when an occupant such as a driver opens a door, gets out of the car, closes the door again and locks the door of the car in order to leave the car.

An in-car telephone system (19) according to the present invention is characterized by the conclusion of the prescribed period of the return combination mode, being based on the instant when wireless communication between the portable telephone unit and the hands-free unit becomes impossible in the above in-car telephone system (13).

Using the above in-car telephone system (19), the hands-free conversation is stopped from the instant when an occupant such as a driver leaves the car, the communication between the portable telephone unit and the hands-free unit stops dead and the hands-free conversation becomes impossible.

An in-car telephone system (20) according to the present invention is characterized by the conclusion of the prescribed period of the return combination mode, being based on the instant when it is detected that a connector through which wire connection between the portable telephone unit and the hands-free unit is established is unhooked in the above in-car telephone system (13).

Using the above in-car telephone system (20), the hands-free conversation is stopped from the instant when the connector connection of the portable telephone unit to the hands-free unit is undone, or in a situation where the user stopped the hands-free conversation and it can be presumed that the user finished making preparations for holding a handset conversation.

An in-car telephone system (21) according to the present invention is characterized by the prescribed period of the return combination mode, whose upper limit is a predetermined upper limit time in any of the above in-car telephone systems (16)–(20).

Using the above in-car telephone system (21), the hands-free conversation is stopped after the upper limit time elapsed, even if predetermined conditions are not met. Therefore, it is possible to hold down needless power consumption of the hands-free unit.

An in-car telephone system (22) according to the present invention is characterized by the hands-free unit, which is connected so that full time power is supplied from a battery independently of the operation of the ignition switch in any of the above in-car telephone systems (1)–(21).

Using the above in-car telephone system (22), even if the ignition switch is not operated, or even if one only gets onto the car, for example, a hands-free conversation becomes possible. Therefore, even when a person except a driver gets into the car ahead of the driver, a hands-free conversation becomes possible, resulting in a very great convenience.

An in-car telephone system (23) according to the present invention is characterized by comprising a battery capacity detector to detect the capacity of the battery, and a restriction device to restrict a hands-free conversation when a low capacity of the battery is detected by the battery capacity detector in the above in-car telephone system (22).

Using the above in-car telephone system (23), when the battery capacity becomes lower, a hands-free conversation is restricted as needed so as to hold down the power consumption, resulting in prevention of a dead battery and the like.

An in-car telephone system (24) according to the present invention is characterized by comprising an announcing device to announce the restriction of a hands-free conversation by the restriction device during working of the engine of the car in the above in-car telephone system (23).

Using the above in-car telephone system (24), even if the battery is low, a hands-free conversation is possible during the engine's working time when the probability of a dead battery is low due to power generation.

An in-car telephone system (25) according to the present invention is characterized by comprising an announcing device to announce the restriction of a hands-free conversation when a hands-free conversation is restricted by the restriction device in the above in-car telephone system (23) or (24).

Using the above in-car telephone system (25), since the restriction of a hands-free conversation is announced to the user, it is possible to prevent the user from being bewildered because of the hands-free conversation being impossible, for example, for the reason that the user confuses it with a failure of the system or the like.

A hands-free unit (1) according to the present invention is the hands-free unit in any of the above in-car telephone systems (1)–(25).

Using the above hands-free unit (1), it becomes possible to provide an automatic switching function between a handset conversation and a hands-free conversation to the corresponding portable telephone unit.

A portable telephone unit (1) according to the present invention is the portable telephone unit in any of the above in-car telephone systems (1)–(25).

Using the above portable telephone unit (1), it becomes possible to automatically switch between a handset conversation and a hands-free conversation to getting-on or getting-off a car on which the corresponding hands-free unit is mounted.

A hands-free unit (2) according to the present invention is characterized by being a hands-free unit, being connected to a portable telephone unit conducting wireless telephone communication, which outputs a receiving voice from the portable telephone unit through a speaker arranged in a car and outputs an aural signal input from a microphone arranged in the car to the portable telephone unit as a transmitting signal, comprising a connection detector to detect the communicative connection with the portable telephone unit, and a hands-free-unit-side mode switching device to start the hands-free conversation processing and transmit a hands-free conversation mode switching signal showing that the condition is changed to a hands-free conversation condition to the portable telephone unit, when the communicative connection with the portable telephone unit is detected by the connection detector.

Using the above hands-free unit (2), it becomes possible to provide an automatic switching function between a handset conversation and a hands-free conversation to the corresponding portable telephone unit.

A portable telephone unit (2) according to the present invention is characterized by being a portable telephone unit, being connectable to a hands-free unit which outputs a receiving voice from a portable telephone unit conducting wireless telephone communication through a speaker arranged in a car and outputs an aural signal input from a microphone arranged in the car to the portable telephone unit as a transmitting signal, comprising a switching signal receiving device to receive a hands-free conversation mode switching signal showing that the condition is changed to a hands-free conversation condition from the hands-free unit, and a portable-telephone-side mode switching device to stop the handset conversation processing and start the hands-free conversation processing, when the switching signal receiving device receives a hands-free conversation mode switching signal.

Using the above portable telephone unit (2), it becomes possible to automatically switch between a handset conversation and a hands-free conversation to getting-on or getting-off a car on which the corresponding hands-free unit is mounted.

DESCRIPTION OF THE PREFERRED EMBODIMENTS

Figure 1:
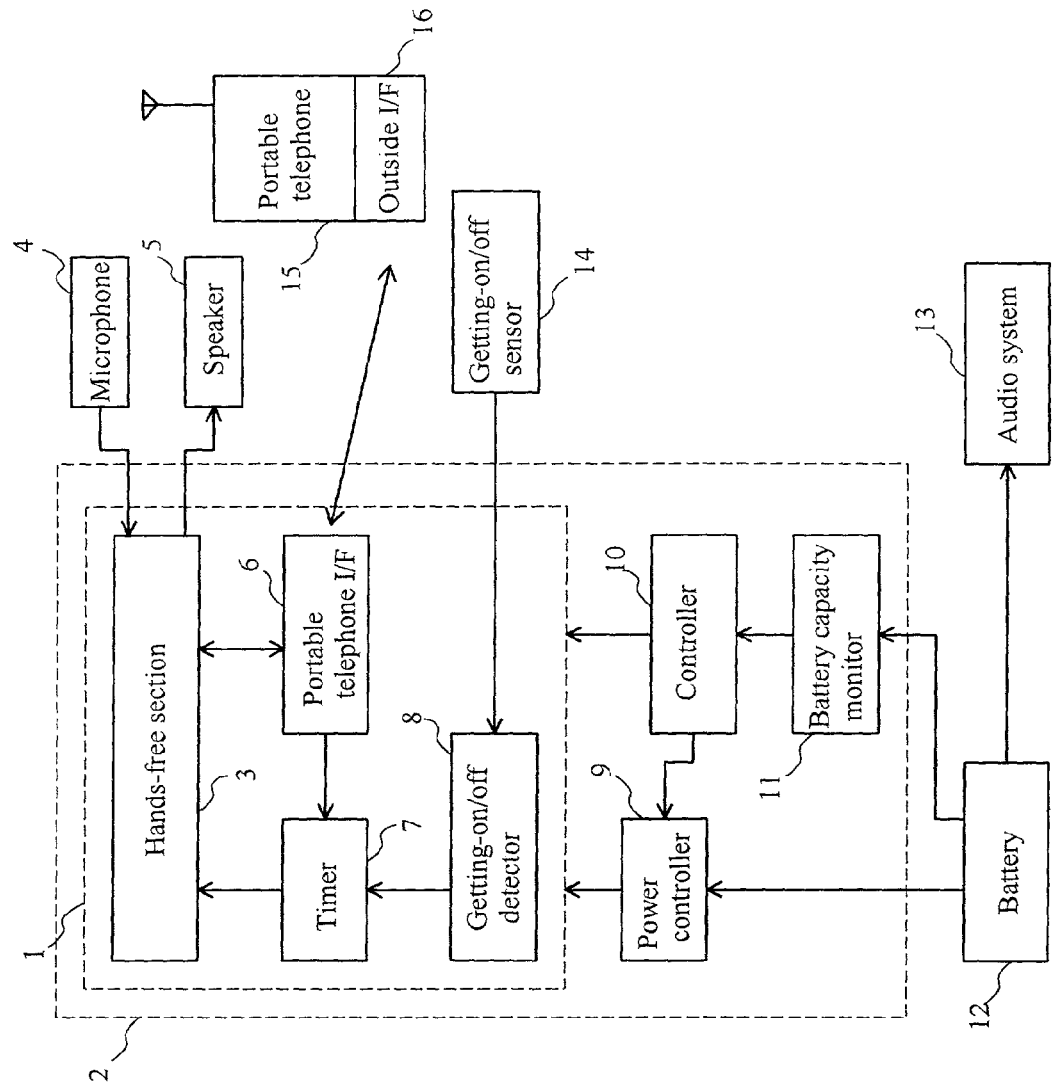
FIG. 1 is a block diagram schematically showing the construction of an in-car telephone system according to an embodiment of the present invention.

The in-car telephone system according to the preferred embodiment of the present invention is described below by reference to the figures. FIG. 1 is a block diagram schematically showing the construction of an in-car telephone system according to an embodiment.

Reference numeral 1 in the figure represents a hands-free main body, which comprises a hands-free section 3, a portable telephone interface 6, a timer 7 and a getting-on/off detector 8. To the hands-free section 3, a microphone 4 and a speaker 5 are connected. The microphone 4 is arranged in a position which is suitable for a hands-free conversation inside a car such as a horn operating part of a steering wheel, the upper portion of an instruction panel, a sun visor for a driver or the like. An output signal from the microphone 4 is input to the hands-free section 3, and finally sent to a called party as a transmitting aural signal. The speaker 5 is arranged in a suitable place where a voice is received well and there is little interference with the microphone 4. A receiving aural signal from the called party is output from the hands-free section 3 to the speaker 5, through which it is reproduced as a voice. The hands-free section 3 has an amplifying circuit (not shown) for processing of aural signals to the microphone 4 and the speaker 5, a switch circuit (not shown) and the like, and comprises an operating part (not shown) comprising a microcomputer (not shown) for each type of control, data processing and the like, switches for each type of operation and the like, and a display (not shown) comprising a liquid crystal display and the like.

The portable telephone interface 6 is for communicatively connecting with a portable telephone 15. A narrow area wireless LAN (such as a system called BLUETOOTH) or the like can be used as a communication connecting system in the in-car telephone system according to the embodiment, and other narrow area wireless systems can be applied, as a matter of course. Therefore, in the portable telephone 15 conducting wireless telephone communication, an outside interface 16 for wireless connection with the hands-free main body 1 besides a normal communication circuit for a wireless telephone is included, so that the portable telephone 15 and the hands-free main body 1 can perform communications of phone call aural signals and each kind of data.

Here, since a narrow area communication (low power) is adopted as the wireless communication system, the portable telephone 15 and the hands-free main body 1 can perform communication only when the distance between them is short (inside the car and around the car within the range of about 1–2 m). The communication between the portable telephone 15 and the hands-free main body 1 can be done not only by the wireless communication system but also by wire connection using a connector. And it can be also done by the combination of the wireless communication system and the wire connection using a connector.

Inside the car, a getting-on/off sensor 14 is arranged. A signal from the getting-on/off sensor 14 is input to the getting-on/off detector 8. The getting-on/off detector 8 judges the getting-on/off of an occupant such as a driver, or the necessity of a hands-free conversation and a handset conversation, based on the signal from the getting-on/off sensor 14.

The getting-on/off sensor 14 comprises a taking-a-seat sensor (comprising a pressure sensor set within a seat, an optical sensor to detect the occupant's position by the interception/reflection state of a beam of light passing through the seat position, and the like) to detect an occupant's taking a seat, and a door's state sensor to output signals showing the open/closed state of doors and the locked/unlocked state of door locks. The getting-on/off detector 8 judges the getting-on/off of an occupant by reading changes in output signals from these sensors.

The timer 7 performs a timer operation based on a signal from the getting-on/off detector 8 and a signal from the portable telephone interface 6, and outputs a signal whereby a period of combination of a hands-free conversation and a handset conversation is determined to the hands-free section 3.

The battery 12 mounted on the car supplies power to a car audio system 13 and the like through an ignition switch (accessory switch) (not shown). A power controller 9 is directly (not through the ignition switch) connected to the battery 12 of the car. By this power controller 9, the power supply to the hands-free main body 1 is controlled. Therefore, even when the ignition switch is OFF, a hands-free conversation is possible. The power controller 9 comprises a relay (not shown) and a switching transistor (not shown).

A battery capacity monitor 11 monitors voltage fluctuation of the battery 12 to detect a drop in capacity thereof and outputs a low-capacity signal to a controller 10. When the controller 10 receives a low-capacity signal, it performs the restriction of a hands-free conversation. That is, at the time of low battery capacity, the power supply to the hands-free main body 1 is stopped by controlling the power controller 9 so as to inhibit a hands-free conversation, leading to the power consumption held down. And while the engine of the car is working, power is generated, so that the probability of a dead battery is low even at the time of low battery capacity. Therefore, the power supply to the hands-free main body 1 is maintained and a hands-free conversation is allowed. In addition, the controller 10 outputs a signal showing that a hands-free conversation is inhibited to the hands-free main body 1 at the time of low battery capacity and allows it to indicate or announce with voice that a hands-free conversation is inhibited because of a reduction in battery capacity. A hands-free unit 2 comprises the hands-free main body 1, power controller 9, controller 10 and battery capacity monitor 11.

Figure 2:
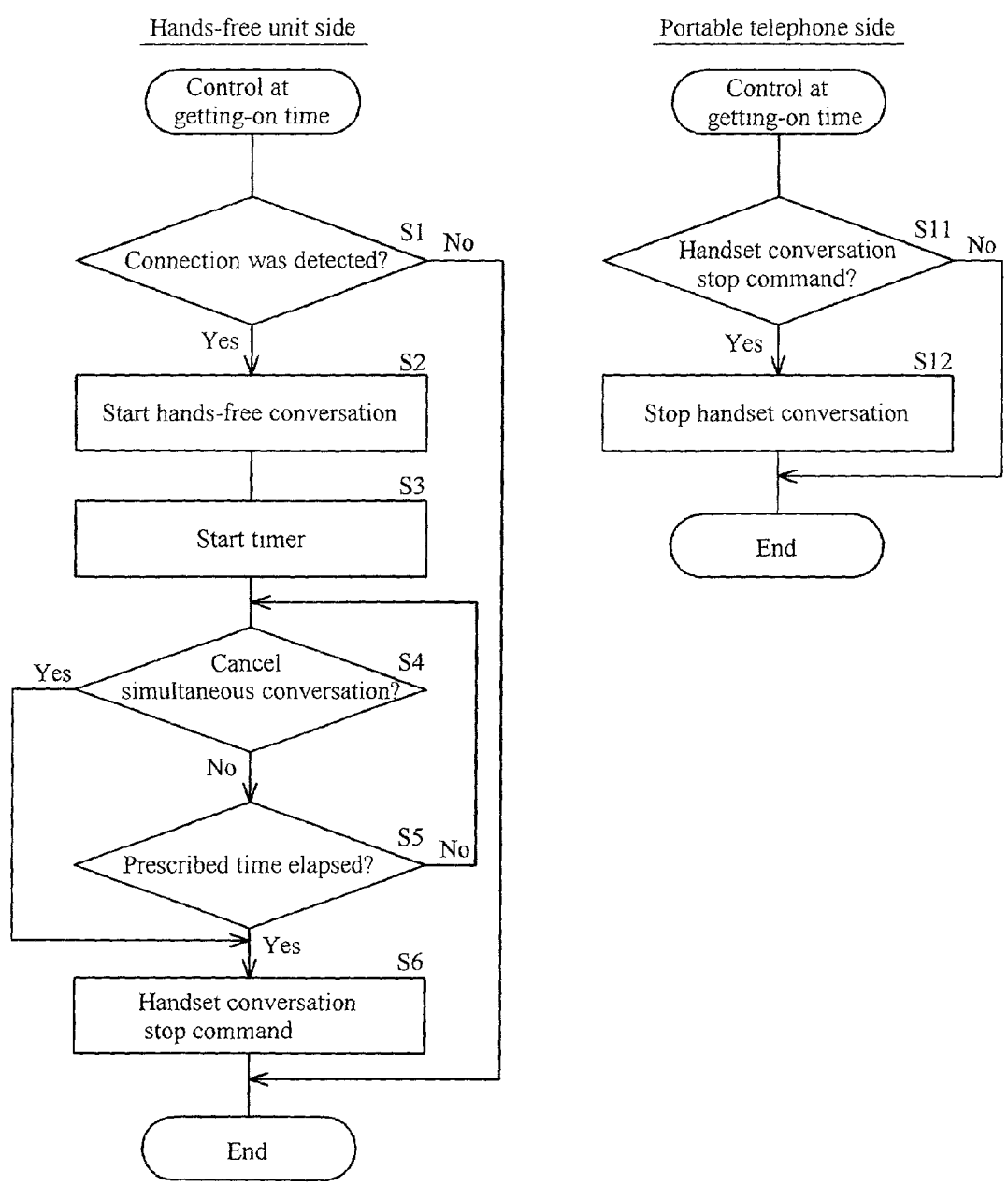
FIG. 2 is a flow chart showing the control when detecting the connection performed by a hands-free unit and a portable telephone.

The control at the time of getting-on of an occupant carrying the portable telephone 15, performed by the hands-free unit 2 and the portable telephone 15, more accurately, microcomputers embedded in each of the hands-free unit 2 and the portable telephone 15 is described below. FIG. 2 is a flow chart showing the control at the time of getting-on of an occupant carrying the portable telephone 15, performed by the hands-free unit 2 and the portable telephone 15. Here, these operations are conducted repeatedly with other operations during a handset conversation.

On the hands-free unit 2 side, in Step 1, the state of the communicative connection of the portable telephone 15 is judged. When the state is judged to be connected, the operation goes to Step 2, while when the connection is not detected, the processing is ended. That is, when the communicative connection of the portable telephone 15 is detected, the following processing for conducting a hands-free conversation is conducted. Here, the communicative connection of the portable telephone 15 is judged by detecting the communication of the portable telephone interface 6 with the outside interface 16 of the portable telephone 15 (when a signal from the outside interface 16 is received because of approach of the portable telephone 15), detecting an occupant's taking a seat, detecting that a door of the car is unlocked and opened, or the like.

In Step 2, a hands-free conversation is started, that is, a conversation using the microphone 4 and speaker 5 of the hands-free unit 2 is made possible, and the operation moves to Step 3. In Step 3, the timer, defining the combination period during which both a hands-free conversation and a handset conversation can be held, is started, and it moves to Step 4.

In Step 4, whether the simultaneous conversation cancel conditions of the hands-free conversation and the handset conversation are satisfied or not is judged. When the conditions are judged to be satisfied, the operation goes to Step 6, while when the conditions are judged otherwise, it goes to Step 5. The simultaneous conversation cancel conditions are those with which it is presumed that no problem is caused even by stopping the handset conversation. When the portable telephone 15 was placed on a mounting device for the portable telephone 15 arranged in the car (detected using a pressure sensor, an optical sensor or the like), a case where the portable telephone 15 and the hands-free unit 2 were connected with a connector not shown in the figure (judged from the state of transmitting signals through the connector), the on operation of the ignition switch (the engine-on or accessory-on operation (on operation of power supply to car electronic equipment)), or the operation of a hands-free conversation starting switch of the hands-free unit 2, is exemplified.

In Step 5, whether or not a prescribed time (e.g. 1 min) elapsed after detecting the communicative connection of the portable telephone 15 is judged from the timekeeping state of the timer started in Step 3. When the prescribed time is judged to have elapsed, the operation goes to Step 6, while when it is judged otherwise, it returns to Step 4. This prescribed time is stored in memory, being updatable, and can be set according to the user's preference by the operation of the operating part of the hands-free unit 2. In Step 6, a handset conversation stop command signal is transmitted to the portable telephone 15, leading to the end of the processing.

On the portable telephone 15 side, in Step 11, whether a handset conversation stop command signal is received from the hands-free unit 2 or not is judged. When it is judged to have been received, the operation goes to Step 12, while when it is judged otherwise, the processing is ended. In Step 12, the handset conversation using the portable telephone 15 is stopped (the actions of the microphone and speaker of the portable telephone 15 are stopped), leading to the end of the processing.

Through the above processing, when the communicative connection of the portable telephone 15 is detected, a hands-free conversation is started. And until a prescribed time elapses after the communicative connection of the portable telephone 15 was detected, both the hands-free conversation and the handset conversation become possible. In cases where the portable telephone 15 and the hands-free unit 2 are connected using the connector not shown in the figure when the portable telephone 15 is placed on the mounting device for the portable telephone 15 arranged in the car, the handset conversation is stopped if the conditions such as the on operation of the ignition switch, and the operation of the hands-free conversation starting switch of the hands-free unit 2 are met. And even if these conditions are not met, the handset conversation is stopped when the prescribed time (defined in Step 5) elapsed (the upper limit time has been preselected).

Figure 3:
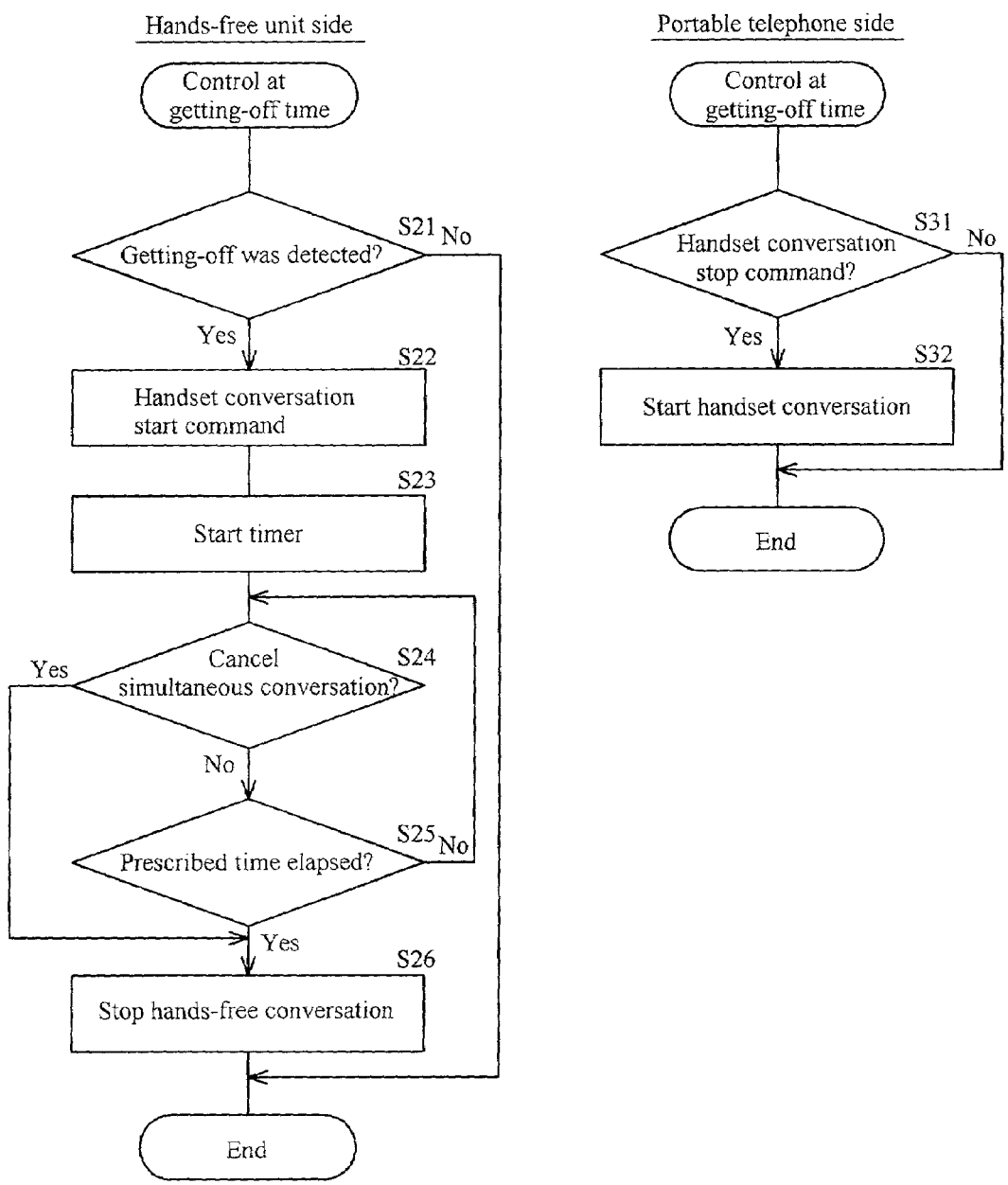
FIG. 3 is a flow chart showing the control at the time of getting-off performed by the hands-free unit and the portable telephone unit.

The control at the time of getting-off of an occupant carrying the portable telephone 15 performed by the hands-free unit 2 and the portable telephone 15 is described below. FIG. 3 is a flow chart showing the control at the time of getting-off of an occupant carrying the portable telephone 15 performed by the hands-free unit 2 and the portable telephone 15. Here, these operations are repeatedly conducted with other operations during a hands-free conversation.

On the hands-free unit 2 side, in Step 21, whether the ignition switch is OFF or not is judged. When it is judged to be ON, the processing is ended, while when it is judged to be OFF, the operation goes to Step 22. That is, when the ignition switch is changed from ON to OFF, the following processing for conducting a handset conversation is carried out.

In Step 22, a handset conversation is started, or a handset conversation start command signal is transmitted to the portable telephone 15, and the operation goes to Step 23. In Step 23, the timer, defining the combination period during which both a hands-free conversation and a handset conversation can be held, is started, and it goes to Step 24.

In Step 24, whether or not the simultaneous conversation cancel conditions of the hands-free conversation and the handset conversation are satisfied is judged. When the conditions are judged to be satisfied, the operation goes to Step 26, while when the conditions are judged otherwise, it goes to Step 25. The simultaneous conversation cancel conditions are those with which it is presumed that no problem is caused by stopping the hands-free conversation. When a signal showing the operation of a handset conversation starting switch of the portable telephone 15 was received, a case where the connector to connect the portable telephone 15 and the hands-free unit 2 was unhooked (judged from the state of transmitting signals through the connector), when the occupant's leaving the seat was detected by the taking-a-seat sensor, when a door of the car was opened and closed again, and then locked, or when the communication between the portable telephone interface 6 and the outside interface 16 of the portable telephone 15 was broken off (no electric wave was detected), is exemplified.

In Step 25, whether or not a prescribed time (e.g. 1 min) elapsed after turning off the ignition switch is judged from the timekeeping state of the timer started in Step 23. When the prescribed time is judged to have elapsed, the operation goes to Step 26, while when it is judged otherwise, it returns to Step 24. Here, this prescribed time is stored in memory, being updatable, and can be set according to the user's preference by the operation of the operating part of the hands-free unit 2. In Step 26, the hands-free conversation is stopped (the actions of the microphone 4 and speaker 5 are stopped), leading to the end of the processing.

On the portable telephone IS side, in Step 31, whether a handset conversation start command signal is received from the hands-free unit 2 or not is judged. When it is judged to have been received, the operation goes to Step 32, while when it is judged otherwise, the processing is ended. In Step 32, a handset conversation using the portable telephone 15 is started (the actions of the microphone and speaker of the portable telephone 15 are started), leading to the end of the processing.

Through the above processing, when the off operation of the ignition switch is detected, a handset conversation using the portable telephone 15 is started. And until a prescribed time elapses after the off operation of the ignition switch was detected, both the hands-free conversation and the handset conversation become possible. The hands-free conversation is stopped when the connector to connect the portable telephone 15 and the hands-free unit 2 is unhooked, when the occupant leaves the seat, when a door of the car is opened and closed again, and then locked, or when the communication between the portable telephone interface 6 and the outside interface 16 of the portable telephone 15 is broken off, until the handset conversation starting switch of the portable telephone 15 is operated. But when the prescribed time (defined in Step 25) elapses even if these conditions are not met, the hands-free conversation is stopped (the upper limit has been preselected).

Using the in-car telephone system according to the embodiment, in cases where the portable telephone 15 and the hands-free unit 2 are communicatively connected by getting on a car during a handset conversation or the like, the condition is changed to a condition in which a hands-free conversation can be held with maintaining the speaking state. As a result, the operation of making a call again or the like becomes unnecessary, leading to a great convenience.

What is claimed is:

1. An in-car telephone system having:
    a portable telephone unit conducting wireless telephone communication; and
    a hands-free unit, being connected to the portable telephone unit, which outputs a receiving voice from the portable telephone unit through a speaker arranged in a car, and outputs an aural signal input from a microphone arranged in the car to the portable telephone unit as a transmitting signal, said in-car telephone system comprising:
    a connection detector operable to detect that the portable telephone unit and the hands-free unit are communicatively connected; and
    a mode switching device operable to switch from a handset conversation condition to a hands-free conversation condition when the connection between the portable telephone unit and the hands-free unit is detected by the connection detector,
    wherein the mode switching device switches to a combination mode in which both a handset conversation and a hands-free conversation can be held for a prescribed period after detecting the connection between the portable telephone unit and the hands-free unit.

2. An in-car telephone system according to claim 1, wherein the prescribed period of the combination mode is a prescribed length of time.

3. An in-car telephone system according to claim 2, comprising a combination time setting device to set the prescribed time defining the prescribed period of the combination mode.

4. An in-car telephone system according to claim 1, wherein a conclusion of the prescribed period of the combination mode is based on the instant when the portable telephone unit is placed on a mounting device arranged in the car.

5. An in-car telephone system according to claim 1, wherein conclusion of the prescribed period of the combination mode is based on the instant when the wire connection between the portable telephone unit and the hands-free unit is established using a connector.

6. An in-car telephone system according to claim 1, wherein a conclusion of the prescribed period of the combination mode is based on the instant when an ignition switch is turned on.

7. An in-car telephone system according to claim 1, wherein a conclusion of the prescribed period of the combination mode is based on the instant when a hands-free conversation starting switch included in the hands-free unit is operated.

8. An in-car telephone system according to claim 3, wherein an upper limit of the prescribed time of the combination mode is a predetermined upper limit time.

9. An in-car telephone system according to claim 1, wherein the connection detector detects the communicative connection using a taking-a-seat sensor to detect an occupant taking a seat.

10. An in-car telephone system according to claim 1, wherein the connection detector detects the communicative connection by reason of a door of the car being unlocked and opened.

11. An in-car telephone system according to claim 1, further comprising:
    an off-operation detector to detect an off operation of an ignition switch during the hands-free conversation condition; and
    a mode return device to switch from the hands-free conversation condition to the handset conversation condition when the off operation of the ignition switch is detected by the off-operation detector.

12. An in-car telephone system according to claim 11, wherein the mode return device switches to a return combination mode in which both a handset conversation and a hands-free conversation can be held for a prescribed period after detecting the off operation of the ignition switch.

13. An in-car telephone system according to claim 12, wherein the prescribed period of the return combination mode is a prescribed time.

14. An in-car telephone system according to claim 13, further comprising a return combination time setting device to set the prescribed time defining the prescribed period of the return combination mode.

15. An in-car telephone system according to claim 12, wherein a conclusion of the prescribed period of the return combination mode is based on the instant when a handset conversation starting switch included in the portable telephone unit is operated.

16. An in-car telephone system according to claim 12, wherein a conclusion of the prescribed period of the return combination mode is based on the instant when it is detected that an occupant left the seat using a taking-a-seat sensor to detect an occupant taking a seat.

17. An in-car telephone system according to claim 12, wherein a conclusion of the prescribed period of the return combination mode is based on the instant when a door of the car is opened, closed again, and then locked.

18. An in-car telephone system according to claim 12, wherein a conclusion of the prescribed period of the return combination mode is based on the instant when wireless communication between the portable telephone unit and the hands-free unit becomes impossible.

19. An in-car telephone system according to claim 12, wherein a conclusion of the prescribed period of the return combination mode is based on the instant when it is detected that a connector through which wire connection between the portable telephone unit and the hands-free unit is established is unhooked.

20. An in-car telephone system according to claim 15, wherein an upper limit of the prescribed period of the return combination mode is a predetermined upper limit time.

21. An in-car telephone system according to claim 1, wherein the hands-free unit is connected so that full time power is supplied from a battery independently of the operation of the ignition switch.

22. An in-car telephone system according to claim 21, further comprising:
   a battery capacity detector to detect the capacity of the battery; and
   a restriction device to restrict a hands-free conversation when a low capacity of the battery is detected by the battery capacity detector.

23. An in-car telephone system according to claim 22, further comprising a restriction inhibiting device to inhibit the restriction of a hands-free conversation by the restriction device during working of the engine of the car.

24. An in-car telephone system according to claim 22, further comprising an announcing device to announce the restriction of a hands-free conversation when a hands-free conversation is restricted by the restriction device.

25. A hands-free unit, which is connected to a portable telephone unit conducting wireless telephone communication, and which outputs a receiving voice from the portable telephone unit through a speaker arranged in a car and outputs an aural signal input from a microphone arranged in the car to the portable telephone unit as a transmitting signal, said hands-free unit comprising:
   a connection detector operable to detect the communicative connection with the portable telephone unit; and
   a hands-free-unit-side mode switching device operable to start the hands-free conversation processing when the communicative connection with the portable telephone unit is detected by the connection detector,
   wherein the hands-free-unit-side mode switching device starts a timer defining a combination mode period during which both a hands-free conversation and a handset conversation can be held when the communicative connection with the portable telephone unit is detected by the connection detector, and
   wherein the hands-free-unit-side mode switching device transmits a hands-free conversation mode switching signal to the portable telephone unit indicating that a condition is changed to a hands-free conversation condition when the hands-free-unit determines that the combination mode period has ended.

26. A portable telephone unit, which is connectable to a hands-free unit which outputs a receiving voice from a portable telephone unit conducting wireless telephone communication through a speaker arranged in a car and outputs an aural signal input from a microphone arranged in the car to the portable telephone unit as a transmitting signal, said portable telephone unit comprising:
   a switching signal receiving device operable to receive a hands-free conversation mode switching signal showing that a condition is changed to a hands-free conversation condition from the hands-free unit; and
   a portable-telephone-side mode switching device to stop the handset conversation processing and start the hands-free conversation processing, when the switching signal receiving device receives the hands-free conversation mode switching signal,
   wherein the portable telephone unit receives the hands-free conversation mode switching signal from the hands-free unit indicating that a condition is changed to a hands-free conversation condition when the hands-free unit determines that a combination mode period has ended, and
   wherein the combination mode period is a period of time during which both a hands-free conversation and a handset conversation can be held.

27. An in-car telephone system according to claim 23, further comprising an announcing device to announce the restriction of a hands-free conversation when a hands-free conversation is restricted by the restriction device.

* * * * *